Figure 1:
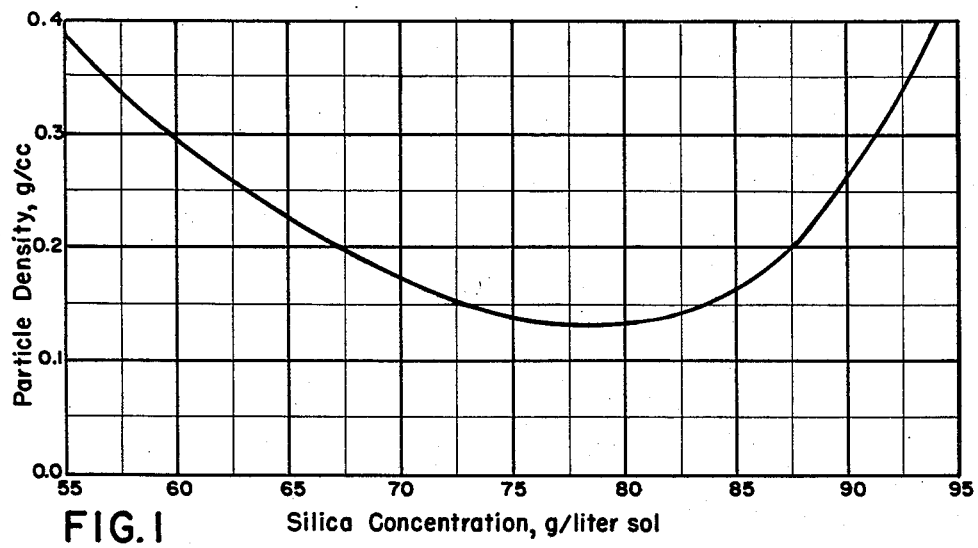

Feb. 26, 1963  E. E. JENKINS ETAL  3,079,234
PROCESS FOR PREPARING SILICEOUS AEROGELS
Filed Oct. 23, 1959

INVENTORS
Edwin E. Jenkins &
BY Albert B. Schwartz

Raymond W. Barclay
ATTORNEY

United States Patent Office 3,079,234
Patented Feb. 26, 1963

3,079,234
PROCESS FOR PREPARING SILICEOUS AEROGELS
Edwin E. Jenkins, Elmer, N.J., and Albert B. Schwartz, Philadelphia, Pa., assignors to Socony Mobil Oil Company, Inc., a corporation of New York
Filed Oct. 23, 1959, Ser. No. 848,340
14 Claims. (Cl. 23—182)

This invention relates to a process for preparing a siliceous gel, one continuous phase of which is a gas, i.e. a siliceous aerogel. More particularly, the present invention is directed to a process for producing aerogels having a solids content consisting essentially of silica by reaction of an alkali metal silicate, an acid and an alkali metal salt under specified conditions of formation.

Aerogels have previously been described in certain patents to Kistler, i.e. U.S. 2,093,454 and 2,249,767. In accordance with the disclosure of such patents a silica hydrogel, formed by the action of an acid on sodium silicate, consists of a continuous solid phase and a continuous liquid phase. The solid phase consists of a structure of silica fibers with the liquid phase being held between these fibers. If such a gel is dried at normal pressure a very marked shrinkage takes place and the resultant product is a heavy hard glass-like mass. The shrinkage is caused by the formation of a gas-liquid interface within the gel pores during the evaporation of the liquid. Surface tension forces existing at this interface are sufficient to cause the fibers to pull together until the structure is sufficiently compressed to withstand such forces. If the gel is heated under sufficient pressure to provide evaporation within the gel, then no gas phase forms until the critical temperature of the liquid is reached. At this point, the liquid phase is converted to the gas phase instantaneously thus avoiding a gas-liquid interface. Once the gas phase has been reached, the gas may be withdrawn without causing any collapse of the solid structure. The resultant product is a light, slightly opalescent solid which may contain as much as 95 percent by volume of air. Since colloidal silica undergoes a change in the presence of water at elevated temperatures resulting in greatly increased particle size, the aqeous phase of the hydrogel is ordinarily replaced with an organic liquid such as ethyl alcohol or ethyl ether before the autoclaving operation. The organic liquid is then removed at a temperature above the critical. At such temperatures no gas-liquid interface is formed and the gel is therefore dried without shrinkage leaving a dried gel of the same volume as the initially formed hydrogel.

The above-described process has the disadvantage of being rather expensive since it entails the use of large amounts of organic liquid, a substantial proportion of which generally cannot be recovered. In addition, it is to be noted that silica aerogels usually cannot be produced from silica gels in which the liquid phase consists of water since such gels ordinarily undergo dissolution before the critical temperature is reached.

It has also heretofore been proposed to prepare aerogels in the form of spheroidal particles by initially forming spheroidal particles of hydrogel and replacing the aqueous phase of the hydrogel particles with an organic liquid and thereafter evaporating such organic liquid at a temperature not below its critical temperature. While it is highly advantageous in some instances to prepare aerogels in the form of spheroidal particles, the above-described process has had the same disadvantage as that of the above initially described process, namely of being relatively expensive in necessitating the use of large amounts of organic liquid which generally are not subject to recovery.

In an attempt to overcome the above-noted disadvantages, it has previously been proposed to prepare siliceous aerogels by initially forming a silica hydrogel upon admixture of sodium silicate with a mineral acid at a pH of about 3.5 to 4.5 and permitting the resulting hydrosol to set to a hydrogel. The silica hydrogel, so obtained, which is substantially free of metallic cations, is then heated in a pressure resistant vessel without substantially subjecting the gel to a compressive liquid-solid interface to remove the liquid aqueous phase of the gel. While such method is generally less expensive than the above-described process utilizing large amounts of an organic liquid, such method has the disadvantage of requiring the use of acid resistant reacting vessels and of costly high pressure equipment.

It is a major object of the present invention to provide a method for preparing silica-containing aerogels and, particularly, silica aerogels which are free of the disadvantages present in the above-described previous procedures. It is a further object of this invention to afford an inexpensive method for producing siliceous aerogels. A still further object of the invention is the provision of a commercially attractive method for preparing silica aerogels in the form of spheroidal particles.

The above and other objects which will be apparent to those skilled in the art are realized in accordance with the method of this invention. Broadly stated, the present process for preparing siliceous aerogels comprises the reaction of an alkali metal silicate with an acid and a water-soluble alkali metal salt to form a siliceous hydrosol characterized by an alkalinity, expressed as the mol ratio of unneutralized alkali metal hydroxide to silica of between 0.3 and 0.7; an alkali metal salt concentration of between about 0.3 and about 3 gram equivalents per liter and a silica concentration of between about 50 and about 300 grams $SiO_2$ per liter of hydrosol. The resulting siliceous hydrosol is permitted to set to a hydrogel upon passage of a suitable interval of time. The resulting hydrogel is thereafter washed free of soluble salts and dried under conditions of substantially atmospheric pressure. The resulting product is a very low density siliceous gel having the characteristics of the above-described aerogels. The product obtained is useful commercially in such applications as insulation, flatting agents for varnishes, lacquers and enamels, reinforcing agents for plastics and rubber, thickening agents for printing inks, non-skid ingredients in floor waxes, mold lubricants, anti-caking agents in powders and various other applications wherein siliceous aerogels have found use.

The alkali metal silicate reagent used in preparing the siliceous sol in accordance with this process will generally be sodium silicate. However, it is contemplated that other suitable alkali metal silicates may be likewise employed, such as, for example, potassium silicate. The acid utilized in preparation of the siliceous sol may be any of those acids heretofore employed for this purpose, including both inorganic and organic acids. Representative examples include hydrochloric acid, nitric acid, acetic acid, sulfuric acid, phosphoric acid, etc. Generally, a mineral acid, i.e. nitric, sulfuric, hydrochloric or phosphoric acid is employed and of this group sulfuric acid is preferred. The water-soluble alkali metal salt utilized in preparation of the siliceous sol is one which has been found suitable for effecting rapid gelation of the sol under conditions which would lead to an extremely long time of gelation in the absence of the salt. The addition of the alkali metal salt also produces a much firmer and stronger gel product than otherwise would be obtained. Satisfactory salts include water-soluble alkali metal salts of organic and mineral acids. The term mineral acid as utilized herein embraces hydrochloric, nitric, sulfuric and phosphoric acids. Suitable representative salts include sodium chloride, lithium chloride, potassium chloride, rubidium chloride, cesium chloride, sodium sulfate, lithium sulfate, potassium sulfate, rubidium sulfate, cesium sulfate, sodium nitrate, lithium nitrate, potassium nitrate, rubidium nitrate, cesium nitrate, sodium acetate, potassium acetate, lithium acetate, rubidium acetate, cesium acetate, sodium citrate, potassium citrate, lithium citrate, rubidium citrate, cesium citrate, sodium formate, potassium formate, lithium formate, rubidium formate, cesium formate, sodium phosphate, potassium phosphate, lithium phosphate, rubidium phosphate and cesium phosphate. Of this group, sodium chloride, due to its low cost and ready availability is accorded preference.

It has been found essential to the success of the present process that the alkalinity, silica concentration and salt concentration of the hydrosol be controlled within specified limits in order to achieve the desired low density silica gel product. Control of temperature of the hydrosol is also an important factor in realizing the desired siliceous aerogel product.

Thus, the relative proportions and concentrations of the reagents are controlled such that the resulting sol has a silica concentration of between about 50 and about 300 grams $SiO_2$ per liter and preferably between about 50 and about 100 grams $SiO_2$ per liter to obtain the lowest density aerogel. It has been found that lower concentrations of silica, contrary to what might be expected, actually result in higher gel densities.

It has been further been established, as will be evident from data set forth hereinafter, that the hydrosol produced should be alkaline, having a pH in the approximate range of 10.5 to 11.5 and more particularly, characterized by an alkalinity, expressed as the mol ratio of unneutralized alkali metal hydroxide to silica, of between 0.3 and 0.7. Unneutralized alkali metal hydroxide is the total alkali metal hydroxide in the sol minus the amount which has been neutralized by the acid.

The concentration of alkali metal salt in the sol, is, in accordance with the process of this invention, an extremely important and critical factor in obtaining the desired firm siliceous aerogel characterized by a short time of gelation. It has been found essential that the concentration of alkali metal salt in the siliceous hydrosol produced be controlled between about 0.3 and about 3 gram equivalents per liter. The term "gram equivalent," as utilized herein, has its usual significance, being that weight of material which will furnish, react with, or displace 1.008 grams of hydrogen. The above concentration of alkali metal salt represents the total alkali metal salt including the salt initially reacted and that formed by neutralization of the alkali metal hydroxide and acid. For example, when sodium silicate, sulfuric acid and sodium chloride are reacted in accordance with the process described herein, the total concentration of alkali metal salt in the resulting hydrosol includes sodium chloride as well as sodium sulfate, formed by the neutralization of sodium hydroxide with sulfuric acid. It is also contemplated that the above specified concentration of alkali metal salt may be obtained entirely from in situ formation, i.e. without further addition of such salt, by reaction of sufficient alkali metal silicate or hydroxide and sufficient acid to furnish the requisite amount of alkali metal salt.

As noted hereinabove, the temperature of the siliceous hydrosol is a further important factor in achieving the desired siliceous aerogel product. Preferably, the sol forming solutions should be cooled before being combined. The temperature of the resulting sol should desirably be below about 150° F. and preferably below about 60° F., but above the freezing point. When the reactant solutions are combined to form the sol, there is a heat of reaction, so that the temperature of the solutions should be correspondingly lower than the desired sol temperature.

If the above specifications as regards alkalinity, alkali metal salt concentration and silica concentration are followed, the resulting hydrogels are white and opaque and result in a low density gel product characterized by a particle density generally of less than 0.4 gram/cc. On the contrary, if the gels are prepared outside the above ranges, the hydrogel will be translucent or clear and will result in a high density product. Particle density, as utilized herein, is the density, in grams per cubic centimeter of a single particle, excluding the void space between particles but including internal pore volume. Bulk density, depending on the compactness of the solid particles, will be considerably less than the particle density.

The siliceous hydrogel obtained initially contains zeolitic alkali metal due to the use of the alkali metal silicate reagent employed. Thus, when sodium silicate is the reagent employed, the initially formed siliceous gel will contain zeolitic sodium. Such zeolitic alkali metal may be removed from the siliceous gel by base-exchange, i.e. replacement with hydrogen, ammonium or other metal ion. Such base exchange is not essential in obtaining a low density aerogel product in accordance with the process of this invention. However, removal of zeolitic alkali metal may be desirable or necessary depending on the application of the product. Thus, where the siliceous aerogel product is to be used in catalysis either as a catalyst or as a support for an appropriate catalytic agent, it is generally desirable that the product be free of zeolitic alkali metal. Where it is desirable to modify the chemical composition of the aerogel by the introduction of other metal ions such may be accomplished during replacement of the zeolitic alkali metal with a suitable base-exchange solution containing such other desired metal ion. Where it is not desirable or necessary to introduce another metal ion, the base-exchange solution may be an ammonium salt or an acid.

The resulting siliceous hydrogel, whether or not it has undergone base-exchange treatment, is washed free of water-soluble material. The resulting washed gel is thereafter dried generally in air or steam under conditions of substantially atmospheric pressure. The dried gel may be tempered, if desired, depending on the application of the product. Drying of the hydrogel is generally carried out at a temperature between about 150° F. and about 350° F. until the product is substantially free of moisture. The tempering operation, when utilized, is ordinarily carried out at a temperature between about 350 and about 1400° F. for 1 to 24 hours.

The method of this invention is adaptable for formation of aerogels, on a batch basis during which the initial hydrogel is formed in a mass which is subsequently broken up into pieces or particles of desired size. Alternatively, the hydrogel may be initially obtained as spheroidal particles by dropping the sol in the form of globules into a column of water-immiscible liquid so that spheroidal bead-like particles of hydrogel are formed upon gelation.

Thus, in a preferred embodiment of the invention, the siliceous sol formed is passed in a finely divided state into a water-immiscible liquid and retained therein until gelation occurs. The siliceous sol prepared in accordance with the present process, having the above specified characteristics, will not set instantaneously to a gelatinous mass but on the other hand, will set to a hydrogel upon passage of a suitable interval of time. The time differential may be controlled by variation in the solids content of the hydrosol, by variation in alkalinity, by variation in the alkali metal salt concentration and by regulation of the temperature of the sol and the water-immiscible liquid into which the hydrosol is introduced. Such time differential permits passing the hydrosol into the water-immiscible liquid so that the sol may assume the desired spheroidal shape and set to a hydrogel during passage through the liquid. When the hydrosol is formed into spheroidal particles employing the above technique, the gelation time is suitably less than 20 seconds.

The solutions of alkali metal silicate and acid-salt used in formation of the present hydrosols are preferably mixed and introduced as globules into the water-immiscible liquid. The water-immiscible liquid may be maintained at a suitable temperature in order to obtain gelation within the desired time. It will accordingly be understood that the time during which the hydrosol and the resulting hydrogel remain in the water-immiscible liquid and the temperature of such liquid are correlated to obtain the desired particles and that these conditions are inversely related so that if the temperature is increased, the time may be decreased.

Generally, hydrogels prepared by the process described herein are characterized by a gelation time of not more than two hours. Although, it is to be realized that hydrogels having a longer time of set when desired may also be produced by the present method. The method of this invention is particularly suitable for the production of hydrogels characterized by a time of set in the range of 0.5 to 20 seconds, which hydrogels are capable of being formed into the above-described spheroidal particles upon introducing the hydrosol in the form of globules into a water-immiscible medium and maintaining the hydrosol globules in said medium until they set to globules of hydrogel.

While the water-immiscible liquid in which gelation takes place may have a density higher than the siliceous hydrogel particles in which instance the hydrogel particles rise upwardly through the liquid, such method is ordinarily less preferred than in the case where the liquid has a lower density, allowing the hydrosol to be introduced at the top of a column thereof and the spheroidal hydrogel particles formed therein to descend to the bottom of such column. A particularly suitable water-insoluble medium comprises organic liquids such as kerosene, lubricating oil, gas oils, etc. of such viscosity and density characteristics that the siliceous hydrosol introduced therein in the form of globules will settle at the rate such that the hydrosol undergoes gelation to spheroidal particles of hydrogel during passage through the liquid.

After base-exchange of the initially formed siliceous hydrosol particles, if such has been employed to remove zeolitic alkali metal, the hydrogel particles are washed free of soluble matter. A particularly satisfactory method for washing the hydrogel is by percolation either by upward or downward flow of water. After washing, the hydrogel particles are dried under conditions of substantially atmospheric pressure at a temperature generally from about 150 to about 350° F. and then, if desired, tempered at a temperature of from about 350 to 1400° F. for 1 to 24 hours or more. Ordinarily, it is preferred to dry the hydrogel particles in air or an atmosphere of superheated steam at a slow rate since such manner of operation has been found to result in less breakage of the gel particles.

The tempering operation, when employed, is ordinarily carried out in air although other inert atmospheres may likewise be used. The particular temperature chosen for calcination will depend in part on the use to be made of the finished gel. Thus, where the gel is to be used as an adsorbent, as in insulating agent, as a reinforcing agent or thickening agent, it is ordinarily tempered in the approximate range of 350 to 800° F. If, on the other hand, the gel is to be used as a catalyst or catalyst support the temperature of the tempering operation is generally between about 800 and about 1400° F. If desired, the siliceous hydrogel particles may be treated with catalytic components prior to the drying, or drying and tempering operations and the composites so obtained may then be subjected to the above-described drying and tempering.

The following examples will serve to illustrate the method of the invention without limiting the same:

EXAMPLE 1

A silicate solution was prepared by diluting sodium silicate with water to give 14.0 grams $SiO_2$ and 4.36 grams $Na_2O$ in 70.5 ml. of solution. An acid-salt solution containing 1.02 grams $H_2SO_4$ and 12.0 grams NaCl in 129.5 ml. of solution was prepared.

The two solutions were cooled to 40° F. and thereafter quickly mixed. The resulting sol had a pH of 10.8, an alkalinity expressed as the mol ratio of unneutralized sodium hydroxide to silica of 0.51, a sodium salt concentration of 1.13 gram equivalents per liter and a silica concentration of 70 grams per liter of hydrosol. The sol set to hydrogel in 25 seconds. The hydrogel was allowed to stand at a room temperature of about 70° F. for about 1 hour, after which it was cut into cubes and covered with 10 percent by weight ammonium sulfate solution. This latter solution was drained off and replaced with fresh solution every 2 hours for a total of 10 applications. The gel was then water washed free of soluble salts, dried in steam for 4 hours at 253° F., followed by an additional ½ hour at about 250° F. and ½ hour at 300° F. The dried gel was then tempered in air for 5 hours at 400° F. The particle density of the resulting siliceous aerogel was 0.16 gram/cc.

EXAMPLES 2–19

Examples 2 to 17 were prepared with variation in concentration and proportion of reactants in a manner similar to that of Example 1. Examples 18 and 19 were also similar except that in these examples the gels were dried in an oven in a humid air atmosphere for 4 hours at 180° F., followed by 2 hours at 230° F. and 2 hours at 340° F.

Description of Examples 1–19 are set forth in Table I below:

Table I

| Ex. No. | Salt added | | Sol. composition | | | | | | Unneutralized NaOH/ $SiO_2$, mols/ mol | Avg. solution temp., °F. | Sol. properties | | Particle density, g./cc. |
|---|---|---|---|---|---|---|---|---|---|---|---|---|---|
| | Ident. | G./l. | Alkali metal salts, equiv./l. | | | Total NaOH from silicate, mols/l. | Unneutralized sodium hydroxide, mols/l. | $SiO_2$, G./l. | | | Gel time, sec. | pH | |
| | | | From added salt | From silicate plus acid | Total | | | | | | | | |
| 1 | NaCl | 60 | 1.03 | 0.10 | 1.13 | 0.70 | 0.60 | 70 | 0.51 | 40 | 25 | 10.8 | 0.16 |
| 2 | NaCl | 60 | 1.03 | 0.15 | 1.18 | 0.75 | 0.60 | 75 | 0.48 | 40 | 15 | 10.7 | 0.14 |
| 3 | NaCl | 60 | 1.03 | 0.20 | 1.23 | 0.80 | 0.60 | 80 | 0.45 | 40 | 8 | 10.7 | 0.13 |
| 4 | NaCl | 60 | 1.03 | 0.30 | 1.33 | 0.99 | 0.60 | 90 | 0.40 | 40 | 3 | 10.6 | 0.26 |
| 5 | NaCl | 20 | 0.34 | 0.15 | 0.49 | 0.75 | 0.60 | 75 | 0.48 | 40 | 2,220 | 10.8 | 0.25 |
| 6 | NaCl | 40 | 0.68 | 0.15 | 0.83 | 0.75 | 0.60 | 75 | 0.48 | 40 | 65 | 10.9 | 0.14 |
| 7 | NaCl | 80 | 1.37 | 0.15 | 1.52 | 0.75 | 0.60 | 75 | 0.48 | 40 | 7 | 10.8 | 0.16 |
| 8 | NaCl | 100 | 1.71 | 0.15 | 1.86 | 0.75 | 0.60 | 75 | 0.48 | 40 | 6 | 10.7 | 0.20 |
| 9 | NaCl | 120 | 2.06 | 0.15 | 2.21 | 0.75 | 0.60 | 75 | 0.48 | 40 | 4 | 10.8 | 0.18 |
| 10 | NaCl | 60 | 1.03 | 0.55 | 1.58 | 0.75 | 0.20 | 75 | 0.16 | 40 | 3 | 9.3 | 0.64 |
| 11 | NaCl | 60 | 1.03 | 0.35 | 1.38 | 0.75 | 0.40 | 75 | 0.32 | 40 | 4 | 10.5 | 0.42 |
| 12 | NaCl | 60 | 1.03 | 0.25 | 1.28 | 0.75 | 0.50 | 75 | 0.40 | 40 | 6 | 10.7 | 0.21 |
| 13 | NaCl | 60 | 1.03 | 0.21 | 1.24 | 0.75 | 0.54 | 75 | 0.43 | 40 | 8 | 10.9 | 0.13 |
| 14 | NaCl | 60 | 1.03 | 0.09 | 1.12 | 0.75 | 0.66 | 75 | 0.53 | 40 | 40 | 10.8 | 0.22 |
| 15 | NaCl | 60 | 1.03 | 0.05 | 1.08 | 0.75 | 0.70 | 75 | 0.56 | 40 | 75 | 10.9 | 0.26 |
| 16 | NaCl | 60 | 1.03 | 0.03 | 1.06 | 0.75 | 0.72 | 75 | 0.58 | 40 | 165 | 11.0 | 0.22 |
| 17 | NaCl | 60 | 1.03 | 0.01 | 1.04 | 0.75 | 0.74 | 75 | 0.59 | 40 | (¹) | 11.3 | |
| 18 | NaCl | 60 | 1.03 | 0.13 | 1.16 | 0.50 | 0.37 | 50 | 0.44 | 36 | 12 | 10.5 | 0.25 |
| 19 | NaCl | 29 | 0.50 | 0.40 | 0.90 | 1.47 | 1.07 | 147 | 0.44 | 38 | 10 | 11.0 | 0.26 |

¹ Greater than 1 hour.

Figure 3:
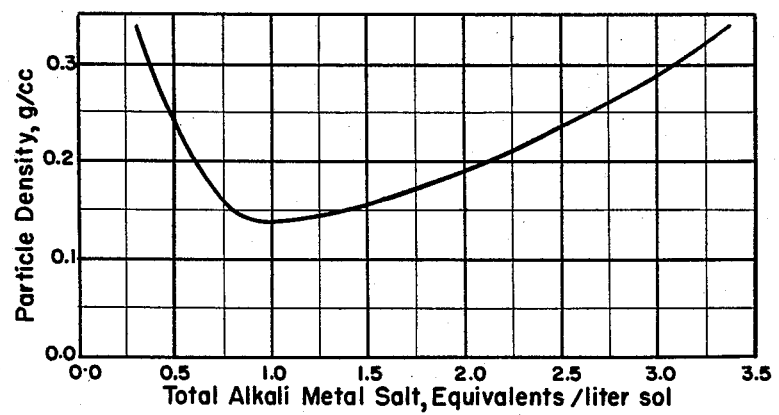
Figure 2:
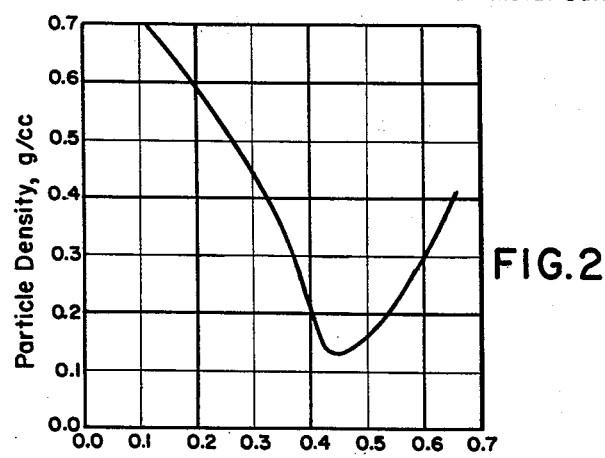

Data of the above table presented graphically in FIGURES 1–3 of the attached drawing respectively show the effects of silica concentration, alkalinity and alkali metal salt concentration of the sol on the density of the aerogel product.

In FIGURE 1, particle density of the aerogel in grams per cc. is plotted against the silica concentration in grams/liter of hydrosol. Referring more particularly to this figure, it will be seen that an unexpected minimum density for the gel product was obtained at a concentration between about 50 and about 100 grams of silica per liter of sol at the particular conditions of alkalinity and alkali metal salt concentration shown in Examples 1–4. At other conditions of alkalinity and alkali metal salt concentration within the ranges specified hereinabove, the minimum density will be achieved at other specified silica concentrations within the approximate range of 50 to 300 grams of $SiO_2$ per liter of sol. It will thus be understood that the optimum concentrations of reactants leading to the requisite alkalinity, silica concentration, and alkali metal salt concentration are interrelated variables.

In FIGURE 2, particle density of the aerogel in grams per cc. is plotted against the alkalinity of the hydrosol, expressed as the mol ratio of unneutralized alkali metal hydroxide to silica. Referring to this figure, it will be seen that an unexpected minimum density for the gel product was obtained when the above mol ratio was between about 0.3 and about 0.7.

In FIGURE 3, particle density of the aerogel in grams per cc. is plotted against the total alkali metal salt concentration expressed in gram equivalents per liter of sol. Referring to this figure, it will be seen that the minimum density for the aerogel product was obtained when the alkali metal salt concentration was between about 0.3 and about 3 gram equivalents per liter of sol.

EXAMPLE 20

A silicate solution was prepared by diluting sodium silicate with water to give 15.0 grams $SiO_2$ and 4.66 grams $Na_2O$ in 100 ml. of solution. An acid-salt solution containing 4.73 grams of citric acid (monohydrate) and 21.8 grams sodium acetate (trihydrate) in 140 ml. of solution was prepared.

The two solutions were cooled to approximately 40° F. and thereafter quickly mixed. The resulting sol had a pH of 10.7, an alkalinity expressed as the mol ratio of unneutralized sodium hydroxide to silica of 0.33, a sodium salt (including sodium acetate and sodium citrate) concentration of 1.1 gram equivalents per liter and a silica concentration of 62.5 grams per liter of hydrosol. The sol set to a hydrogel in four seconds. The hydrogel was cut into cubes and covered with 10 percent by weight ammonium sulfate solution. This latter solution was drained off and replaced with fresh solution every two hours for a total of 10 applications. The gel was then washed free of soluble salts, dried in humid air for about 16 hours at 180° F. The dried gel was then tempered in air for 5 hours at 400° F. The particle density of the resulting siliceous aerogel was 0.28 g./cc.

EXAMPLE 21

A silica aerogel in bead form was prepared as follows: A commercial sodium silicate solution was diluted with water to give a solution containing 14.3 percent by weight $SiO_2$ and 4.45 percent by weight $Na_2O$. The specific gravity of this solution was 1.172 at 60° F. The acid-salt reactant solution contained 3.19 percent by weight $H_2SO_4$ and 12.5 percent by weight NaCl. The specific gravity of this solution was 1.117 at 60° F. The solutions were cooled to an average temperature of 33° F. and mixed in a mixing nozzle at the rate of 350 cc./min. each. The resulting sol having a temperature of 44° F., and a pH of 10.6 was introduced into the top of a column of oil as a finely divided stream. The hydrosol so introduced assumed a globular form and set in about 2.5 seconds to spheroidal particles of hydrogel during passage through the oil column. The resulting hydrogel particles were base-exchanged with an aqueous solution containing 10 percent by weight of ammonium sulfate and treated with such fresh solution every two hours for a total of 10 applications. The hydrogel particles were thereafter washed with water to remove water-soluble impurities. The hydrogel particles were then dried in superheated steam at 251° F. for 3 hours, followed by an additional ½ hour at about 250° F. and ½ hour at 300° F. The dried hydrogel particles were then tempered in air for 5 hours at 400° F. The final silica aerogel product in the form of spheroids had a particle density of 0.30 g./cc.

EXAMPLES 22–27

Examples 22–27 were prepared with variation in concentrations and proportions of reactants in the general manner of Example 21. The results of these examples together with that of Example 21 are set forth in Table II below:

*Table II*

| Ex. No. | Salt added | | Sol. composition | | | | | Unneutralized NaOH/ $SiO_2$, mols/mol | Avg. solution temp., °F. | Sol. properties | | | Particle density, g./cc. |
|---|---|---|---|---|---|---|---|---|---|---|---|---|---|
| | | | Alkali metal salts, equiv./l. | | | Total NaOH from silicate, mols/l. | Unneutralized sodium hydroxide, mols/l. | $SiO_2$, g./l. | | | | | |
| | Ident. | G./l. | From added salt | From silicate plus acid | Total | | | | | | Temp., °F. | Gel time, sec. | pH | |
| 21 | NaCl | 70 | 1.20 | 0.36 | 1.56 | 0.84 | 0.48 | 84 | 0.34 | 33 | 44 | 2.5 | 10.6 | 0.30 |
| 22 | NaCl | 70 | 1.20 | 0.32 | 1.52 | 0.84 | 0.51 | 84 | 0.36 | 33 | 43 | 2.8 | 10.8 | 0.26 |
| 23 | NaCl | 70 | 1.20 | 0.28 | 1.48 | 0.84 | 0.56 | 84 | 0.40 | 33 | 42 | 3.2 | 10.9 | 0.25 |
| 24 | NaCl | 70 | 1.20 | 0.24 | 1.44 | 0.84 | 0.60 | 84 | 0.43 | 33 | 42 | 4.1 | 10.9 | 0.17 |
| 25 | NaCl | 70 | 1.20 | 0.20 | 1.40 | 0.84 | 0.64 | 84 | 0.46 | 39 | 45 | 5.3 | 11.3 | 0.14 |
| 26 | NaCl | 70 | 1.20 | 0.16 | 1.36 | 0.84 | 0.68 | 84 | 0.49 | 39 | 45 | 11 | 11.3 | 0.14 |
| 27 | NaCl | 70 | 1.20 | 0.12 | 1.32 | 0.84 | 0.72 | 84 | 0.52 | 39 | 45 | 23 | 11.4 | 0.14 |

The series of examples below will serve to illustrate the effect of solution temperature on the particle density of the aerogel product obtained:

EXAMPLES 28–32

Following the general procedure of Example 1, sols were prepared containing 80 grams $SiO_2$, 0.42 mol NaOH per mol silica and 1.27 equivalents of alkali metal salts (NaCl and $Na_2SO_4$) per liter using different temperature solutions. The results obtained are set forth in Table III below:

*Table III*

| Example | Average solution temp., °F. | Particle density of aerogel, g./cc. |
|---|---|---|
| 28 | 35 | 0.14 |
| 29 | 40 | 0.16 |
| 30 | 72 | 0.27 |
| 31 | 85 | 0.26 |
| 32 | 100 | 0.24 |

It will be seen from the above data that the use of lower solution temperatures afford a product of reduced particle density. In acordance with the process described herein the temperature of the reactant solutions should be such as to provide a hydrosol having a temperature below about 150° F. and preferably below about 60° F. but above the freezing point of the sol.

The series of examples below will serve to illustrate the effect of base-exchange on the particle density of the aerogel product obtained:

EXAMPLES 33-37

Following the general procedure of Example 21, a sol containing 84 grams $SiO_2$, 1.51 equivalents of alkali metal salts (NaCl and $Na_2SO_4$) and 0.37 mol NaOH per mol silica was prepared and formed into spheroidal hydrogel particles. The results obtained after different types of base exchanges followed by washing, drying and tempering as described in Example 20 are set forth in Table IV below:

*Table IV*

| Example | Base exchange | | Particle density of aerogel, g./cc. |
|---|---|---|---|
| | Solution | Treatment, hr. | |
| 33 | 10% weight $(NH_4)_2SO_4$ | 10-2 | 0.25 |
| 34 | 1% weight $(NH_4)_2SO_4$ | 10-2 | 0.27 |
| 35 | 1% weight $H_2SO_4$ | 10-2 | 0.26 |
| 36 | 1.5% weight $Al_2(SO_4)_3$ | 10-2 | 0.24 |
| 37 | None | | 0.31 |

It will be seen from the above data that while base exchange tended to effect some reduction in the particle density of the aerogel product, no marked difference in density characteristics was obtained upon treatment with the different base-exchange solutions.

The series of examples below will serve to illustrate the use and effect of other metal salts on the particle density of the aerogel product obtained.

EXAMPLES 38-41

The general procedure of Example 1 was followed except that in place of NaCl, the salts specified hereinbelow were used. The composition of the sol and the results obtained in each instance are set forth in Table V below:

*Table V*

| Example | Avg. solution temp., °F. | Sol. composition | | | | Particle Density of aerogel, g./cc. |
|---|---|---|---|---|---|---|
| | | $SiO_2$, g./l. | Salt used | Metal salts, equiv./l | Mols unneutralized NaOH/ mol $SiO_2$ | |
| 38 | 130 | 74 | $K_2SO_4$ | 1.35 | 0.44 | 0.21 |
| 39 | 40 | 80 | $LiNO_3$ | 1.68 | 0.42 | 0.26 |
| 40 | 40 | 80 | $MgCl_2$ | 0.40 | 0.42 | 0.70 |
| 41 | 40 | 80 | $FeCl_3$ | 0.34 | 0.42 | 0.74 |

It is evident from the foregoing data that the alkali metal salts, i.e. potassium sulfate and lithium nitrate as well as sodium acetate utilized in Example 20 are satisfactory in achieving the low density aerogel product, but the other metal salts are unsatisfactory. In the case of the divalent magnesium and trivalent ferric salts, instantaneous precipitation occurred when similar equivalent concentrations to those of the alkali metal salts were used. In these examples, the concentrations were reduced until a gel was formed. However, the densities of the gels so obtained, as will be noted, are high and are not aerogels such as produced in accordance with the method herein.

It is to be understood that the above description is merely illustrative of preferred embodiments of the invention of which many variations may be made by those skilled in the art within the scope of the following claims without departing from the spirit thereof.

We claim:

1. A method for preparing a siliceous aerogel, characterized by a particle density of less than 0.4 gram/cc., which comprises reacting, in an aqueous media, an alkali metal silicate, a mineral acid and a water-soluble alkali metal salt of an acid selected from the group consisting of acetic acid and a mineral acid to form a siliceous hydrosol having a temperature above its freezing point but below about 150° F. characterized by an alkalinity, expressed as the mol ratio of unneutralized alkali metal hydroxide to silica, of between 0.3 and 0.7; an alkali metal salt concentration of between about 0.3 and about 3 gram equivalents per liter and a silica concentration of between about 50 and about 300 grams $SiO_2$ per liter of hydrosol, permitting the resulting hydrosol to set to a hydrogel, washing the hydrogel free of water-soluble material and drying the product so obtained under conditions of substantially atmospheric pressure.

2. A method for preparing a siliceous aerogel, characterized by a particle density of less than 0.4 gram/cc., which comprises reacting, in an aqueous media, an alkali metal silicate, a mineral acid and a water-soluble alkali metal salt of a mineral acid to form a siliceous hydrosol having a temperature above its freezing point but below about 60° F. characterized by an alkalinity, expressed as the mol ratio of unneutralized alkali metal hydroxide to silica, of between 0.3 and 0.7; an alkali metal salt concentration of between about 0.3 and about 3 gram equivalents per liter and a silica concentration of between about 50 and about 300 grams $SiO_2$ per liter of hydrosol, permitting the resulting hydrosol to set to a hydrogel, washing the hydrogel free of water-soluble material and drying the product so obtained under conditions of substantially atmospheric pressure.

3. The method of claim 1 wherein the alkali metal salt is a nitrate.

4. The method of claim 1 wherein the alkali metal salt is a sulfate.

5. The method of claim 1 wherein the alkali metal salt is a chloride.

6. The method of claim 1 wherein the alkali metal salt is an acetate.

7. The method of claim 1 wherein the alkali metal salt is sodium chloride.

8. A mehod for preparing a siliceous aerogel, characterized by a particle density of less than 0.4 gram/cc., which comprises reacting, in an aqueous media, sodium silicate, sulfuric acid and sodium chloride to form a siliceous hydrosol having a temperature above its freezing point but below about 150° F. characterized by an alkalinity, expressed as the mol ratio of unneutralized sodium hydroxide to silica of between O.3 to 0.7; a sodium salt concentration of between about 0.3 and about 3 gram equivalents per liter and a silica concentration of between about 50 and about 100 grams $SiO_2$ per liter of hydrosol, permitting the resulting hydrosol to set to a hydrogel, washing the hydrogel free of water-soluble material and drying the product so obtained under conditions of substantially atmospheric pressure.

9. A method for preparing a siliceous aerogel, characterized by a particle density of less than 0.4 gram/cc., which comprises reacting, in an aqueous media, an alkali metal silicate, a mineral acid and a water-soluble alkali metal salt of a mineral acid to form a siliceous hydrosol having a temperature above its freezing point but below 150° F. and characterized by an alkalinity, expressed as the mol ratio of unneutralized alkali metal hydroxide to silica of between 0.3 and 0.7; an alkali metal salt concentration of between about 0.3 and about 3 gram equivalents per liter and a silica concentration of between about 50 and about 300 grams $SiO_2$ per liter of hydrosol, permitting the resulting hydrosol to set to a hydrogel, washing the hydrogel free of water-soluble material, drying the product so obtained under conditions of substantially atmospheric pressure at a temperature between about 150 and about 350° F. and tempering the dried product at a temperature of from about 350 to 1400° F. for 1 to 24 hours.

10. A process for forming spheroidal particles of a siliceous aerogel, characterized by a particle density of less than 0.4 gram/cc., which comprises reacting, in an aqueous media, an alkali metal silicate, a mineral acid and a water-soluble alkali metal salt of an acid selected from the group consisting of acetic acid and a mineral acid to form a siliceous hydrosol having a temperature above its freezing point but below about 150° F. characterized by an alkalinity, expressed as the mol ratio of unneutralized alkali metal hydroxide to silica of between 0.3 and 0.7; an alkali metal salt concentration of between 0.3 and about 3 gram equivalents per liter and a silica concentration of between about 50 and about 300 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material and drying the product so obtained under conditions of substantially atmospheric pressure.

11. The process of claim 10 wherein the alkali metal salt is a salt of a mineral acid.

12. The process of claim 10 wherein the alkali metal salt is an acetate.

13. The process of claim 10 wherein the alkali metal salt is sodium chloride.

14. A process for forming spheroidal particles of a siliceous aerogel, characterized by a particle density of less than 0.4 gram/cc., which comprises reacting, in an aqueous media, an alkali metal silicate, a mineral acid and a water-soluble alkali metal salt of an acid selected from the group consisting of acetic acid and a mineral acid to form a siliceous hydrosol having a temperature above its freezing point but below about 150° F. which has a time of gelation of less than about 20 seconds, and an alkalinity, expressed as the mol ratio of unneutralized alkali metal hydroxide to silica of between 0.3 to 0.7; an alkali metal salt concentration of between about 0.3 and about 3 gram equivalents per liter, and a silica concentration of between about 50 and about 300 grams $SiO_2$ per liter of hydrosol, introducing said hydrosol as a finely divided stream into a water-immiscible medium wherein the hydrosol sets to globules of hydrogel, washing the resulting hydrogel globules free of water-soluble material, drying the product so obtained under conditions of substantially atmospheric pressure at a temperature of between about 150 and about 350° F. and tempering the dried product at a temperature of from about 350 to 1400° F. for 1 to 24 hours.

References Cited in the file of this patent

UNITED STATES PATENTS

| | | |
|---|---|---|
| 2,188,007 | Kistler | Jan. 23, 1940 |
| 2,249,767 | Kistler | July 22, 1941 |
| 2,280,650 | Kassel | Apr. 21, 1942 |
| 2,341,276 | Kanhofer | Feb. 8, 1944 |
| 2,385,217 | Marisic | Sept. 18, 1945 |
| 2,438,560 | Kanhofer | Mar. 30, 1948 |
| 2,480,628 | Bodkin | Aug. 30, 1949 |
| 2,574,763 | Sears | Nov. 13, 1951 |
| 2,765,242 | Alexander et al. | Oct. 2, 1956 |
| 2,940,830 | Thornhill | June 14, 1960 |

FOREIGN PATENTS

| | | |
|---|---|---|
| 745,822 | Great Britain | Mar. 7, 1956 |